United States Patent [19]
Terry

[11] 3,816,805

[45] June 11, 1974

[54] DUAL BATTERY ELECTRICAL SYSTEM FOR INTERNAL COMBUSTION ENGINE

[75] Inventor: Stanley M. Terry, Dayton, Maine

[73] Assignee: Maremont Corporation, Saco, Maine

[22] Filed: May 16, 1973

[21] Appl. No.: 360,908

[52] U.S. Cl. .................................. 320/15, 307/16
[51] Int. Cl. ............................................. H02j 7/14
[58] Field of Search ............... 320/15, 17, 18, 6, 14; 322/90; 307/16

[56] References Cited
UNITED STATES PATENTS
3,555,395   1/1971   Beery ............................... 320/14 X
3,671,843   6/1972   Huntzinger et al. .................. 320/15

*Primary Examiner*—J. D. Miller
*Assistant Examiner*—Robert J. Hickey
*Attorney, Agent, or Firm*—McCormick, Paulding & Huber

[57] ABSTRACT

In a dual battery system for an internal combustion engine, as used in a vehicle or the like, wherein an auxiliary battery is connected in series with a service battery to provide a high battery voltage for a starter circuit, a charging means is provided for charging both the service battery and the auxiliary battery without changing their series connection. This charging means comprises an alternator, rectifier and voltage regulator for charging the service battery and an additional rectifier connected to the alternator through an isolation transformer for charging the auxiliary battery.

14 Claims, 1 Drawing Figure

3,816,805
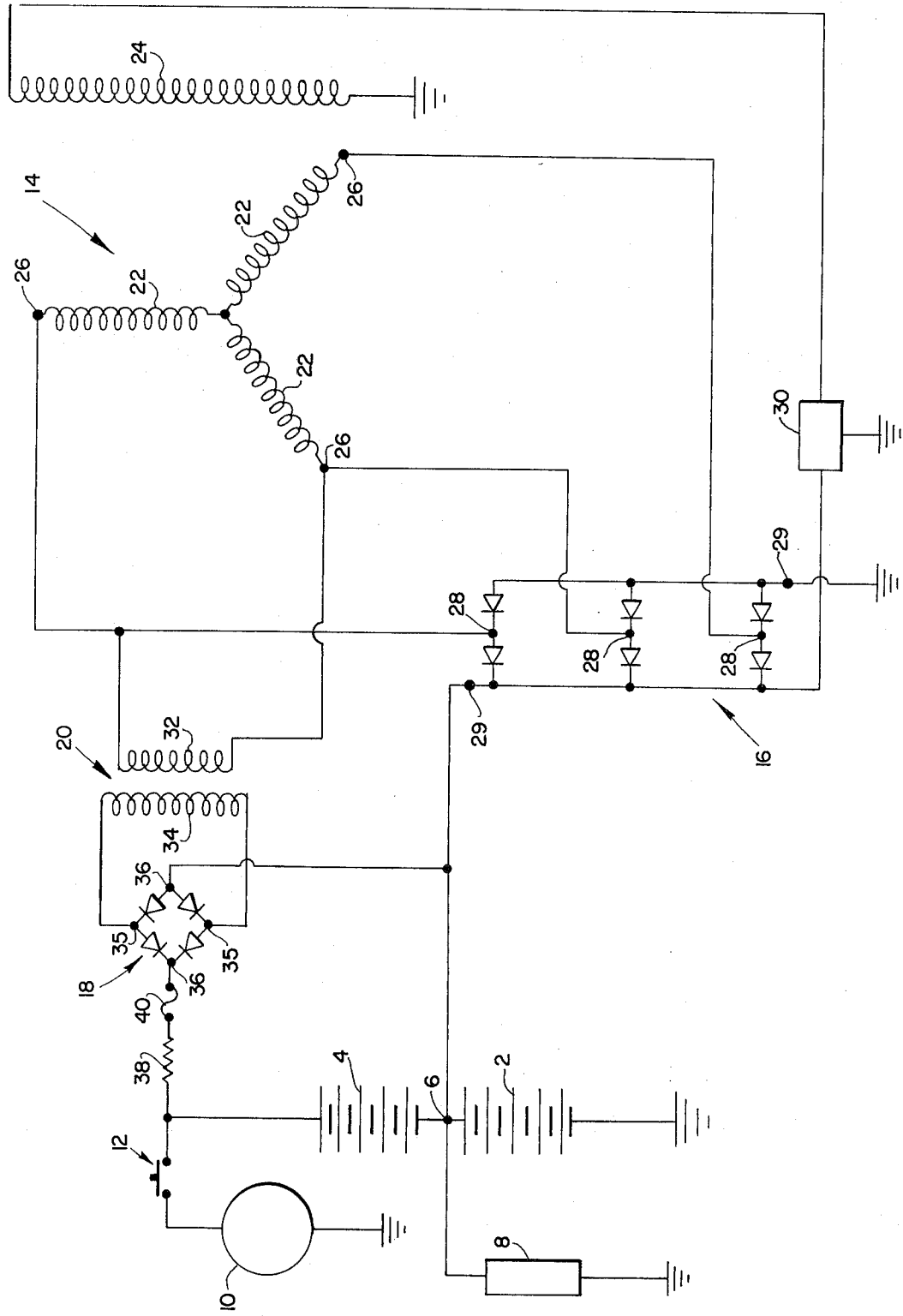

3,816,805

DUAL BATTERY ELECTRICAL SYSTEM FOR INTERNAL COMBUSTION ENGINE

BACKGROUND OF THE INVENTION

This invention deals with electrical systems for internal combustion engines, and deals more particularly with such a system including two batteries connected in series with one another to provide a high voltage for starting the engine and including a means for charging both of the batteries when the engine is running.

With regard to electrical systems for internal combustion engines, it is known, particularly in the case of relatively large engines such as large diesel engines used in some trucks, to provide two batteries which during starting of the engine are connected in series with one another to provide a high battery voltage for the starter circuit. A known dual battery system, for example, includes two 12-volt batteries and a series-parallel switch by means of which the two batteries may be connected either in series to provide a 24-volt output for starting or in parallel to provide a 12-volt output for normal service. In this case, the two batteries are connected in parallel while the associated engine is running and a conventional charging means may be used for charging them. This system is, however, subject to the problem that the series-parallel connection is an extreme source of failure and other trouble.

The general object of this invention is, therefore, to provide a dual battery electrical system for an internal combustion engine wherein the two batteries are maintained in series connection at all times, thereby eliminating the need for a series-parallel switch, and an associated charging system is provided whereby both of the batteries are simultaneously charged from one standard generating system having a voltage rating equal to the voltage rating of one of the two batteries. That is, if the two batteries are 12-volt batteries, they may both be charged simultaneously from one standard 12-volt alternator while maintained in their series-connected condition.

A further object of this invention is to provide a dual battery electrical system of the foregoing character wherein the charging means for the two batteries is relatively inexpensive to build, is reliable, is easy to repair when necessary, and will not cause generator problems in the event of a failure.

SUMMARY OF THE INVENTION

This invention resides in a dual battery electrical system for an internal combustion engine which system includes a service battery and an auxiliary battery each having one of its terminals connected to one of the terminals of the other so as to provide a series-connected combination of batteries. A starter motor circuit is connected across the series combination of batteries so that the starter circuit is provided with a high voltage for energizing the starter when the starter circuit is closed. The normal or service load is connected across only the service battery. A charging system for simultaneously charging the two batteries consists of a single alternator driven by the associated engine. A first rectifier is connected to the output of the alternator and applies its rectified output across the service battery, and a voltage regulator controls the energization of the field winding of the alternator to maintain the voltage appearing across the service battery relatively constant. A second rectifier is connected to the auxiliary battery for charging it and is powered from the alternator through an isolation transformer. Preferably, the alternator is a three-phase alternator and the first rectifier is a three-phase rectifier having all three output phases of the alternator as an input thereto, and the second rectifier is a single phase rectifier with the isolation transformer having its primary winding connected to only one output phase of the alternator. In this case, and assuming that the two batteries are of substantially equal voltage rating, the transformer ratio of the isolation transformer is approximately 1.3 so that the voltage applied across the auxiliary battery by the second rectifier is approximately equal to the voltage applied across the service battery by the first rectifier. A resistor can be included in the output circuit of the second rectifier to limit the charging current supplied to the auxiliary battery when such battery is at a low charge level. battery is at a low charge level.

BRIEF DESCRIPTION OF THE DRAWING

The single FIGURE of the drawing is a schematic wiring diagram illustrating a dual battery electrical system embodying this invention for use with an internal combustion engine.

DETAILED DESCRIPTION OF THE PREFERRED EMBODIMENT

Referring to the drawing, the electrical system there illustrated includes a service battery 2 and an auxiliary battery 4. Within the broader aspects of the invention the two batteries may be of different output voltage ratings, but preferably they are generally identical batteries of equal output voltage and for the purposes of the following discussion they are both taken to be conventional 12-volt batteries of the type presently commonly used in vehicles. The service battery 2 has its positive terminal directly connected to the negative terminal of the auxiliary battery 4 at a common or intermediate terminal 6. The connection between the two batteries made at the terminal 6 is a relatively permanent one. That is, it may be undone for the purpose of replacing one or the other or both of the two batteries, but otherwise the connection is maintained at all times throughout the use of the system. Accordingly, the two batteries are connected in series with one another through the common terminal 6 to provide a series combination across which the voltages of the two batteries appear with additive effect. That is, between the negative terminal of the service battery 2 and the positive terminal of the auxiliary battery 4 there appears a nominal 24-volt output voltage. One terminal of the service battery 2 can be grounded to the associated vehicle and/or engine structure. In the schematic drawing, the negative terminal of the service battery 2 is shown grounded and other terminals or lines which are shown in the drawing to be grounded are likewise connected to the vehicle and/or engine structure and are, accordingly, connected to the negative terminal of the service battery 2 through the ground circuit.

The service battery 2 has a conventional service load 8 connected across its terminals so that the service load is energized by the 12-volt output of the service battery. The service load 8 may include an ignition system for other than compression ignition internal combustion engines and also includes other electrically powered devices such as headlamps, marker lights, radios, heater ventilating and air conditioning motors and the like as may be included in the vehicle or other application with which the engine is used. For starting the associated engine, the illustrated electrical system includes a starter circuit connected across the series combination of the two batteries 2 and 4. As shown, this starter circuit comprises a starter motor 10 and a starter switch 12. Accordingly, when the starter switch 12 is closed, 24 volts of battery power, supplied by the series combination of the batteries 2 and 4, are applied to the starter motor 10 for cranking the associated engine.

The dual battery system as so far described is advantageous since it supplies a high voltage for cranking the associated engine, as is desirable in the case of relatively large engines, and yet it provides a lower standard voltage for energizing the service load thereby allowing the service load to be comprised of components designed for such lower standard voltage. However, in the past dual battery systems for providing a higher-than-normal starting voltage have posed problems with regard to the charging of the two batteries. In the illustrated system, the charging is accomplished through the use of a single alternator and other components all of which are or may be of generally standard construction. Also, the charging circuit for the auxiliary battery is a circuit completely separate and electrically isolated from the charging circuit for the service battery in order to avoid short-circuited paths, particularly at the output terminals of the alternator when delivering power.

More particularly, the charging means, as illustrated in the drawing, comprises an alternator 14, driven by the associated engine, and first and second rectifiers 16 and 18. The three-phase A.C. output of the alternator 14 is directly connected to the input terminals of the main rectifier 16, and the D.C. output of the rectifier 16 is connected across only the service battery 2. The second rectifier 18 is connected to one phase of the A.C. output of the alternator 14 through an isolation transformer 20 and, in turn, has its D.C. output connected across only the auxiliary battery 4. The first rectifier 16, therefore, supplies charging current to the service battery 2, and the second rectifier 18 supplies charging current to the auxiliary battery 4 with the charging circuit for the auxiliary battery being electrically isolated from the alternator and the charging circuit for the service battery 2 through the isolation transformer 20.

The alternator 14 is preferably a three-phase alternator, as shown, having three generating windings 22, 22 and a field winding 24. The generating windings 22, 22 are connected to three alternator output terminals 26, 26 so that a conventional three-phase output voltage is provided at the three terminals 26, 26. That is, an output voltage waveform appears between each different pair of output terminals 26, 26 with the three different output voltage waveforms from the three different pairs of output terminals being phase shifted by 120 electrical degrees from one another. In the illustrated case, the three generating windings 22, 22 are connected to one another and to the output terminals 26, 26 in a wye configuration, but this is not essential to the invention and, if desired, an alternator having a set of delta connected generating windings may be used in place of the alternator 14.

The illustrated rectifier 16 is a three-phase bridge rectifier having three input terminals 28, 28 connected respectively to the output terminals 26, 26 of the alternator 14. The two output terminals 29, 29 of the rectifier 16 are connected across the service battery 2. That is, the negative output terminal 29 is grounded and the positive terminal 29 is connected to the intermediate terminal 6 between the two batteries. A voltage regulator 30 is also connected across the service battery 2 and controls the energization of the alternator field winding 24 in response to the detected voltage across the service battery so as to maintain the output voltage of the rectifier 16 and, accordingly, the voltage appearing across the service battery 2 at a substantially constant level. The voltage regulator 30 is or may be of a generally conventional construction such as the type customarily used to maintain a regulated voltage in a 12-volt battery system. The regulator 30 maintains an essentially constant voltage on the service battery 2 and service load 8, regardless of the load, within the output capability of the alternator 14. Such voltage is normally slightly higher than the rated or output voltage of the service battery 2 so that when the engine and alternator are running a charging current is supplied to the service battery 2.

The isolation transformer 20 is a single phase transformer having a primary winding 32 with opposite ends connected respectively to two of the output terminals 26, 26 of the alternator 14. Accordingly, only one phase of the output of the alternator 14 is supplied to the transformer 20. The secondary winding 24 of the transformer 20 is connected across the input terminals 35, 35 of the rectifier 18, the rectifier 18 being a full wave, single phase bridge rectifier having its output terminals 36, 36 connected across the auxiliary battery 4. One of the output terminals 36, 36 of the rectifier 18 is connected to its associated terminal of the battery 4 through a resistance 38 and a fuse or similar circuit breaker device 40.

The transformer ratio of the transformer 20 is such that the average rectified D.C. output voltage applied to the auxiliary battery 4 from the single phase rectifier 18 is substantially equal to the average rectified D.C. voltage applied to the service battery 2 by the three-phase rectifier 16. This transformer ratio is approximately 1.3, and is derived from the fact that the average D.C. output voltage of a three-phase bridge rectifier is equal to the effective A.C. input voltage times 1.17, and the average D.C. output voltage of a single phase bridge rectifier is equal to the effective A.C. input voltage times 0.9. Therefore, since the effective A.C. input voltage to both of the rectifiers is the same, an isolation transformer with a 1.3 ratio is used to match the average output voltage of the rectifier 18 to the average output voltage of the rectifier 16 since $(0.9 \times 1.3 = 1.17)$.

Since the auxiliary battery 4 is used only intermittently, when starting loads are drawn from it, only a fairly low charge rate is normally required to maintain it in a fully charged condition. The maximum charging rate is determined by the value of the series resistor 38. As an example, a maximum charging rate of 8 to 10 amperes may be used for the auxiliary battery 4, in which case the series resistor 38 may have a value of approximately 0.2 ohms. In this case, the single phase bridge rectifier 18 is also preferably sized for a ten ampere maximum capability and the circuit breaker 40 is likewise designed to break at a current of 10 or slightly more than 10 amperes to protect the system in the case of shorts or auxiliary battery failure.

Because of the 1.3 transformer ratio of the isolation transformer 20, the average output voltage of the single phase rectifier 18 will always be approximately equal to the average output voltage of the three-phase main rectifier 16. As previously mentioned, the output voltage of the main rectifier 16 is closely controlled by the voltage regulator 30. Therefore, the output voltage of the single phase rectifier 18 is likewise closely controlled by the regulator 30 and, accordingly, no additional regulating means is required by the charging circuit for the auxiliary battery 4.

If the auxiliary battery 4 is at a low charge level, it could temporarily take on input charging current in excess of the ten ampere or other design limit. Assuming that the regulator 30 is holding a normal voltage (approximately 14 volts) on the service battery and load, a ten ampere load in the auxiliary battery charging circuit will cause about a 2 volt drop through the 0.2 ohm resistor, reducing the voltage at the auxiliary battery 4 to approximately 12 volts. Even a very low 12-volt battery cannot accept more than a few amperes of charging current at this voltage level. As the auxiliary battery 4 charges, the voltage across its terminals will rise until it is fully charged, at which time it will merely float on the line at approximately 14 volts. The 0.2 ohm suggested value of the series resistance 38 is approximate and may be varied above or below this suggested value as may be desired in particular applications. Also, the 1.3 transformer ratio of the isolation transformer 20 may be varied fractionally up or down to vary the regulated charging voltage on the auxiliary battery 4 as may be desired to meet specific operating or system conditions. An advantage of the illustrated system is that this variation in the transformer ratio may be obtained by merely bringing out a number of secondary winding taps from the transformer 20 and using the particular tap which most closely provides the desired transformer ratio. The taps can also be connected to a tap switch to permit independent adjustment of the auxiliary battery charging voltage as necessary to suit operating conditions. In addition, the windings of the isolation transformer may be designed such that their A.C. impedances are equivalent to the desired D.C. resistance normally incorporated in the associated D.C. circuit, thereby eliminating the need for a separate resistor, such as the resistor 38, in the D.C. circuit.

I claim:

1. An electrical system associated with an internal combustion engine, said system comprising: a service battery and an auxiliary battery each having two terminals of opposite polarity, said service battery having one of its terminals directly connected to one of said terminals of said auxiliary battery with said two directly connected terminals of said two batteries being of opposite polarity so that said two batteries form a series connected combination of two batteries, a starter motor circuit connected across said series combination of two batteries, a service load circuit connected across said service battery, an alternator, a first rectifier arranged to rectify the output of said alternator and to apply its rectified output across said service battery, a second rectifier, and an isolation transformer connected between said second rectifier and said alternator for supplying said second rectifier with power from said alternator, said second rectifier having a pair of output terminals connected across said auxiliary battery.

2. An electrical system as defined in claim 1 further characterized by said alternator including a field winding, and a voltage regulator responsive to the voltage across said service battery for controlling the energization of said field winding so as to maintain the voltage across said service battery substantially constant.

3. An electrical system as defined in claim 2 further characterized by said alternator being a three-phase alternator, said first rectifier being a three-phase rectifier and having all three phases of said alternator as an input thereto, and said second rectifier being a single phase rectifier and having only one phase of said alternator as an input thereto.

4. An electrical system as defined in claim 3 further characterized by a series resistance connected between said second rectifier and said auxiliary battery.

5. An electrical system as defined in claim 3 further characterized by said service battery and said auxiliary battery both having substantially the same voltage rating and said isolation transformer having a transformer ratio of approximately 1.3.

6. An electrical system associated with an internal combustion engine, said system comprising: first, second and third terminals, a service battery connected between said first and second terminals, an auxiliary battery connected between said second and third terminals, a starter motor circuit connected across said first and third terminals, a service load circuit connected across said first and second terminals, a polyphase alternator having an output consisting of a plurality of generally similar voltage waveforms phase displaced from one another, a polyphase rectifier having two output terminals, said polyphase rectifier being connected with said polyphase alternator so as to have as an input thereto all of said output voltage waveforms of said alternator and being operable to convert said output voltage waveforms of said alternator into a rectified voltage appearing across said two output terminals thereof, means connecting said two output terminals of said polyphase rectifier respectively to said first and second terminals, an isolation transformer having primary and secondary windings, means connecting said primary winding of said isolation transformer to said polyphase alternator so that one of said output voltage waveforms of said alternator is applied across said primary winding, a single phase rectifier having two input terminals and two output terminals, means connecting said secondary winding of said isolation transformer across said two input terminals of said single phase rectifier, and means connecting said two output terminals of said single phase rectifier respectively to said second and third terminals.

7. An electrical system as defined in claim 6 further characterized by a voltage regulator connected with said alternator and with said first and second terminals and operable to vary the excitation of said alternator so as to maintain a substantially constant voltage between said first and second terminals.

8. An electrical system as defined in claim 6 further characterized by said first terminal being a ground terminal.

9. An electrical system as defined in claim 6 further characterized by said service battery and said auxiliary battery both having substantially the same voltage rating, and said isolation transformer having a transformer ratio such that the average voltage appearing across said two output terminals of said single phase rectifier is approximately equal to the average voltage appearing across said two output terminals of said polyphase rectifier.

10. An electrical system as defined in claim 6 further characterized by said polyphase alternator being a three-phase alternator having three output terminals, and said polyphase rectifier being a three-phase bridge rectifier having three input terminals connected respectively to said three output terminals of said alternator, said primary winding of said isolation transformer being connected to said alternator by being connected across two of said output terminals of said alternator.

11. An electrical system as defined in claim 10 further characterized by said service battery and said auxiliary battery both having substantially the same voltage rating, and said transformer having a transformer ratio of approximately 1.3.

12. An electrical system as defined in claim 6 further characterized by a resistor, one of said output terminals of said single phase rectifier being connected to its associated one of said second and third terminals through said resistor.

13. An electrical system as defined in claim 6 further characterized by a circuit breaker device, one of said output terminals of said single phase rectifier being connected to its associated one of said second and third terminals through said circuit breaker device.

14. An electrical system as defined in claim 7 further characterized by said alternator having a plurality of generating windings in which said output voltage waveforms are generated and a field winding the excitation of which controls the amount of power generated in said generating windings, said voltage regulator including means for varying the excitation of said field winding in response to changes in the voltage between said first and second terminals so as to maintain said latter voltage at a substantially constant value.

* * * * *